United States Patent
Dörr et al.

(10) Patent No.: US 11,155,731 B2
(45) Date of Patent: Oct. 26, 2021

(54) COMPOSITION, ITS PRODUCTION AND USE THEREOF

(71) Applicant: Covestro Deutschland AG, Leverkusen (DE)

(72) Inventors: Sebastian Dörr, Düsseldorf (DE); Evgeny Avtomonov, Leverkusen (DE); Yingdan Zhu, Shanghai (CN); Chen Jin, Guangzhou (CN); Winnie Wei, Shanghai (CN); Maria Zhou, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 238 days.

(21) Appl. No.: 16/489,025

(22) PCT Filed: Feb. 28, 2018

(86) PCT No.: PCT/EP2018/054858
§ 371 (c)(1),
(2) Date: Aug. 27, 2019

(87) PCT Pub. No.: WO2018/158278
PCT Pub. Date: Sep. 7, 2018

(65) Prior Publication Data
US 2020/0062994 A1 Feb. 27, 2020

(30) Foreign Application Priority Data

Feb. 28, 2017 (CN) .......................... 201710149825.3
Dec. 1, 2017 (CN) .......................... 201711254752.0

(51) Int. Cl.
| | |
|---|---|
| *C09D 175/06* | (2006.01) |
| *C08G 18/32* | (2006.01) |
| *C08G 18/42* | (2006.01) |
| *C09J 175/06* | (2006.01) |
| *C08K 5/17* | (2006.01) |
| *C08K 3/32* | (2006.01) |
| *C08G 18/65* | (2006.01) |
| *C08G 18/73* | (2006.01) |

(52) U.S. Cl.
CPC ....... *C09D 175/06* (2013.01); *C08G 18/3206* (2013.01); *C08G 18/4241* (2013.01); *C08G 18/6511* (2013.01); *C08G 18/73* (2013.01); *C08K 5/175* (2013.01); *C09J 175/06* (2013.01); *C08K 2003/324* (2013.01)

(58) Field of Classification Search
CPC .......... C08L 75/04–06; C08G 18/0866; C08G 18/42–4297; C09D 175/06; C09J 175/06
See application file for complete search history.

(56) References Cited

U.S. PATENT DOCUMENTS

| | | | |
|---|---|---|---|
| 3,798,198 A | 3/1974 | Hole | |
| 6,479,153 B1 * | 11/2002 | Kato | ........................ D06N 3/14 |
| | | | 428/423.7 |
| 2002/0028875 A1 | 3/2002 | Anderle et al. | |
| 2009/0264577 A1 | 10/2009 | Blum et al. | |
| 2010/0260687 A1 * | 10/2010 | Yu | ........................... A61P 31/00 |
| | | | 424/43 |

FOREIGN PATENT DOCUMENTS

| | | | |
|---|---|---|---|
| CN | 106243312 A | 12/2016 | |
| EP | 0381125 B1 * | 11/1994 | ........... C09D 201/00 |
| EP | 0356655 B1 * | 12/1995 | ................ C08J 5/06 |
| GB | 1453694 A | 10/1976 | |
| JP | H07118263 A | 5/1995 | |
| JP | 2006272767 A * | 10/2006 | |
| JP | 2006274096 A | 10/2006 | |

OTHER PUBLICATIONS

Machine Translation of JP2006-272767A. Oct. 12, 2006. (Year: 2006).*
Asensio et al. Tunable Structure and Properties of Segmented Thermoplastic Polyurethanes as a Function of Flexible Segment. Polymers, 2019, 11, 1910. (Year: 2019).*
International Search Report for PCT/EP2018/054858 dated May 23, 2018.
Written Opinion of the International Searching Authority for PCT/EP2018/054858 dated May 23, 2018.

* cited by examiner

*Primary Examiner* — Stephen E Rieth
(74) *Attorney, Agent, or Firm* — Faegre Drinker Biddle & Reath LLP

(57) ABSTRACT

The present invention relates to a composition, a process for its production, and use thereof. The composition comprises water, a polyurethane polymer and a water-soluble salt of a chelating agent, said polyurethane polymer having a hydrolyzable group, said polyurethane polymer is a reaction product comprising the following reactive components: Component A) an isocyanate, Component B) a compound having an isocyanate-reactive group, wherein said compound comprises at least one group that can be converted to said hydrolyzable group, optionally Component C) an emulsifier, optionally Component D) a solvent, and optionally Component E) a reactive diluent; wherein said water-soluble salt of the chelating agent is present in an amount of from 0.04 to 1.8% by weight, relative to 100% by weight of said polyurethane polymer.

17 Claims, No Drawings

COMPOSITION, ITS PRODUCTION AND USE THEREOF

CROSS-REFERENCE TO RELATED APPLICATIONS

This application is a national stage application (under 35 U.S.C. § 371) of PCT/EP2018/054858, filed Feb. 28, 2018, which claims benefit of Chinese Application Nos. 201710149825.3, filed Feb. 28, 2017, and 201711254752.0, filed Dec. 1, 2017, all of which are incorporated herein by reference in their entirety.

TECHNICAL FIELD

The present invention relates to a composition having a long shelf life, production of the composition and use thereof, particularly in the fields of coatings, sealants and adhesives, and articles obtained by coating with the composition.

BACKGROUND ART

Polyurethane polymers can be mixed with water to form an aqueous polyurethane dispersion. The shelf life, also referred to as the usable time or working life, of the aqueous polyurethane dispersion refers to the longest period of time from the completion of the production of the aqueous polyurethane dispersion to the time showing a loss of usability, which loss means that coatings, sealants and adhesives containing the aqueous polyurethane dispersion no longer meet the usage requirements. Long shelf life is generally desirable in the industry, because it offers the producer and the user ample time for storage and usage.

In aqueous polyurethane dispersions, particularly in aqueous polyurethane dispersions containing a hydrolysable group, the hydrolyzable group has a very high tendency to hydrolysis when stored under ambient conditions, as compared to solvent-based polyurethanes or solid-type polyurethanes. Hydrolysis of aqueous polyurethane dispersions is often manifested as a decrease in the molecular weight of the polyurethane polymer.

The decrease in the molecular weight of the polyurethane polymer is manifested as an affection on the adhesion force, stain resistance, scratch resistance, impact resistance, elongation at break and washability of the coating, in the field of coated articles, or, in the field of sealant and adhesive products, as an affection on the heat resistance of the sealant and the adhesive.

Therefore, in order to prolong the shelf life of the aqueous polyurethane dispersion, it is necessary to mitigate the hydrolysis of the hydrolyzable group in the aqueous polyurethane dispersion.

Polyurethane solids can be hydrolyzed in the environment to produce carboxyl groups. In the prior art, carbodiimides or epoxy-based stabilizers are added to polyurethane solids to react with the carboxyl groups produced by hydrolysis, so as to relieve further hydrolysis of the solid polyurethane to extend the shelf life of the solid polyurethane. However, in the aqueous polyurethane dispersion system, most of the carboxyl groups produced by the hydrolysis of the hydrolyzable groups are encapsulated in polyurethane particles, so that it is difficult for the carbodiimide groups or epoxy groups to react with these carboxyl groups. Therefore, the addition of the stabilizer cannot mitigate the hydrolysis of the hydrolyzable groups in an effective manner.

U.S. Pat. No. 3,798,198 discloses a solvent-based or solvent-free polyurethane composition comprising a chelating agent in an amount of at least 0.5% by weight, relative to 100% by weight of the solid polyurethane.

GB 1453694 discloses a solvent-based polymer composition comprising an ester of a chelating agent in an amount of from 0.001 to 20%, relative to 100% by weight of the solid polymer.

EP0356655B1 and EP0381125B1 disclose, separately, a composition for the production of reinforcing materials, comprising at least one crosslinkable polyurethane film-forming material, at least one acrylic polymer, an effective amount of a carrier capable of providing an reinforcing effect, such as water, and optionally a salt, an ester or an ether of a chelating agent, in which the chelating agent is used in an amount of from 0.01 to 2% by weight, relative to 100% by weight of solid in the composition. The reinforcing material prepared from this composition has good heat resistance and solvent resistance.

The prior art focuses on solving the problem of hydrolysis of solvent-based or solvent-free polymer systems, or the hydrolysis problem of coatings after drying, and there is no good solution to the hydrolysis problem of aqueous polyurethane dispersions during the storage period.

SUMMARY OF THE INVENTION

It is an object of the present invention to provide a composition having a long shelf life, production of the composition and use thereof, particularly in the fields of coatings, sealants and adhesives, and articles obtained by coating with the composition.

The composition according to the present invention comprises water, a polyurethane polymer and a water-soluble salt of a chelating agent, said polyurethane polymer having a hydrolyzable group, said polyurethane polymer is a reaction product comprising the following reactive components:

Component A) an isocyanate,
Component B) a compound having an isocyanate-reactive group, wherein said compound comprises at least one group that can be converted to said hydrolyzable group,
optionally Component C) an emulsifier,
optionally Component D) a solvent, and
optionally Component E) a reactive diluent;

said water-soluble salt of the chelating agent is present in an amount of from 0.04 to 1.8% by weight, relative to 100% by weight of said polyurethane polymer; and said water-soluble salt of the chelating agent comprises a water-soluble monovalent salt of the chelating agent present in an amount of no less than 30% by weight, relative to 100% by weight of said water-soluble salt of the chelating agent.

According to an embodiment of the present invention, there is provided a process for the production of the composition according to the present invention, comprising the steps of: mixing, in any suitable manner, water, said polyurethane polymer or the components for producing said polyurethane polymer, and said water-soluble salt of the chelating agent.

According to an embodiment of the present invention, there is provided use of the composition according to the present invention for the production of a coated article.

According to an embodiment of the present invention, there is provided a coated article, comprising a substrate and the composition according to the present invention coated on said substrate.

According to an embodiment of the present invention, there is provided a process for the production of a coated article, comprising coating the composition according to the present invention onto a substrate.

It has been found in the present application that metal ions resulted from the production of polyurethane polymers, such as metal ions introduced as a result of the use of catalysts, will promote the hydrolization of hydrolyzable groups of the polyurethane polymers. Therefore, in the present invention, water-soluble salts of chelating agents, especially water-soluble monovalent salts of the chelating agents, are introduced in an appropriate amount to capture the metal ions by forming stable compounds, so as to prevent the hydrolization of the hydrolyzable groups promoted by the metal ions, whereby mitigating the hydrolization of the hydrolyzable groups and alleviating the decrease in the molecular weight of the polyurethane polymers, so that the performance of the compositions can be stabilized and the shelf life of the compositions can be prolonged.

DETAILED DESCRIPTION OF THE INVENTION

The present invention provides a composition, comprises water, a polyurethane polymer and a water-soluble salt of a chelating agent, said polyurethane polymer having a hydrolyzable group, said polyurethane polymer is a reaction product comprising the following reactive components:

Component A) an isocyanate,

Component B) a compound having an isocyanate-reactive group, wherein said compound comprises at least one group that can be converted to said hydrolyzable group, optionally Component C) an emulsifier, optionally Component D) a solvent, and optionally Component E) a reactive diluent;

said water-soluble salt of the chelating agent is present in an amount of from 0.04 to 1.8% by weight, relative to 100% by weight of said polyurethane polymer; and said water-soluble salt of the chelating agent comprises a water-soluble monovalent salt of the chelating agent present in an amount of no less than 30% by weight, relative to 100% by weight of said water-soluble salt of the chelating agent. The present invention also provides a process for the production of the composition, and use thereof, as well as a coated article obtained by coating the composition onto a substrate, and a process for the production of a coated article.

Polyurethane Polymer

As used herein, the polyurethane polymer refers to a polyurethaneurea polymer and/or a polyurethane polyurea polymer and/or a polyurea polymer and/or a polythiourethane polymer.

The hydrolyzable group can be one or more selected from the group consisting of polyester groups, polycarbonate groups and polyanhydride groups, and is most preferably a polyester group.

The polyurethane polymer has a melting enthalpy of preferably greater than 15 J/g as measured by DSC using the first heating curve in a temperature range of from 20 to 100° C. according to DIN65467.

Component A)

The isocyanate has a functionality of preferably no less than 2, and more preferably 2 to 4.

The isocyanate can be one or more selected from the group consisting of: aliphatic isocyanates, alicyclic isocyanates and aromatic isocyanates.

The aliphatic isocyanate can be one or more selected from the group consisting of: 1,6-hexamethylene diisocyanate, 2,2-dimethylpentyl diisocyanate, 2,2,4-trimethylhexamethylene diisocyanate, butylene diisocyanate, 1,3-butadiene-1,4-diisocyanate, 2,4,4-trimethyl-1,6-hexamethylene diisocyanate, 1,6,11-undecane triisocyanate, 1,3,6-hexamethylene triisocyanate, 1,8-diisocyanato-4-isocyanatomethyl octane, bis(isocyanatoethyl) carbonate, bis(isocyanatoethyl) ether, lysine diisocyanatomethyl ester, lysine triisocyanate, bis(isocyanatomethyl)sulfide, bis(isocyanatoethyl)sulfide, bis(isocyanatopropyl)sulfide, bis(isocyanatohexyl)sulfide, bis(isocyanatomethyl)sulfone, bis(isocyanatomethyl)disulfide, bis(isocyanatoethyl)disulfide, bis(isocyanatopropyl)disulfide, bis(isocyanatomethylthio)methane, bis(isocyanatoethylthio)methane, bis(isocyanatomethylthio)ethane, bis(isocyanatoethylthio)ethane, 1,5-diisocyanato-2-isocyanatomethyl-3-thiapentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanatomethylthiophene, isocyanatoethylthio-2,6-dithia-1,8-octane diisocyanate, thiobis(3-isothiocyanatopropane), thiobis(2-isothiocyanatoethane), dithiobis(2-isothiocyanatoethane), hexamethylene diisocyanate and isophorone diisocyanate, and is preferably 1,6-hexamethylene diisocyanate.

The alicyclic isocyanate can be one or more selected from the group consisting of: 2,5-bis(isocyanatomethyl)-bicyclo[2.2.1]heptane, 2,6-bis(isocyanatomethyl)-bicyclo[2.2.1]heptane, bis(isocyanatomethyl)cyclohexane, isophorone diisocyanate, 2,5-diisocyanatotetrahydrothiophene, 2,5-diisocyanatomethyltetrahydrothiophene, 3,4-diisocyanatomethyltetrahydrothiophene, 2,5-diisocyanato-1,4-dithiane, 2,5-diisocyanatomethyl-1,4-dithiane, 4,5-diisocyanato-1,3-dithiolane, 4,5-bis(isocyanatomethyl)-1,3-dithiolane, 4,5-diisocyanatomethyl-2-methyl-1,3-dithiolane, norbornane diisocyanate (NBDI), xylylene diisocyanate (XDI), hydrogenated-xylylene diisocyanate ($H_6$XDI), 1,4-cyclohexylene diisocyanate ($H_6$PPDI), 1,5-pentamethylene diisocyanate (PDI), m-tetramethylxylylene diisocyanate (m-TMXDI) and cyclohexane diisothiocyanate, and is preferably isophorone diisocyanate and/or dicyclohexyl diisocyanate.

The aromatic isocyanate can be one or more selected from the group consisting of: 1,2-diisocyanatobenzene, 1,3-diisocyanatobenzene, 1,4-diisocyanatobenzene, 2,4-diisocyanatotoluene, ethylphenylene diisocyanate, isopropylphenylene diisocyanate, toluene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylene bis(phenylisocyanate), 4,4'-methylene bis(2-methylphenylisocyanate), bibenzyl-4,4'-diisocyanate, bis(isocyanatophenyl)ethylene, bis(isocyanatomethyl)benzene, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethylphenyl)ether, bis(isocyanatoethyl)phthalate, 2,6-di(isocyanatomethyl)furan, 2-isocyanatophenyl-4-isocyanatophenyl sulfide, bis(4-isocyanatophenyl)sulfide, bis(4-isocyanatomethylphenyl)sulfide, bis(4-isocyanatophenyl)disulfide, bis(2-methyl-5-isocyanatophenyl)disulfide, bis(3-methyl-5-isocyanatophenyl)disulfide, bis(3-methyl-6-isocyanatophenyl)-disulfide, bis(4-methyl-5-isocyanatophenyl)disulfide, bis(4-methoxy-3-isocyanatophenyl)disulfide, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-methylene bis(phenylisothiocyanate), 4,4'-methylene bis(2-methylphenylisothiocyanate), 4,4'-methylene bis (3-methylphenylisothiocyanate), 4,4'-diisothiocyanatobenzophenone, 4,4'-diisothiocyanato-3,3'-dimethylbenzophenone, bis(4-isothiocyanatophenyl) ether, 1-isothiocyanato-4-[(2-isothiocyanato)sulfonyl]benzene, thiobis(4-isothiocyanatobenzene), sulfonyl(4-isothiocyanatobenzene), hydrogenated-tolylene diisocyanate ($H_6TDI$) and dithiobis(4-isothiocyanatobenzene), and is preferably 1,2-diisocyanatobenzene, 1,3-diisocyanatobenzene, 1,4-diisocyanatobenzene, 2,4-diisocyanatotoluene.

The isocyanate can also have an isocyanate group and an isothiocyanate group, such as 1-isocyanato-6-isothiocyanatohexane, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanatophenyl-4-isothiocyanatophenyl sulfide and 2-isocyanatoethyl-2-isothiocyanatoethyl disulfide.

The isocyanate can also be a halo-substituted, such as chloro-substituented, and bromo-substituted, alkyl-substituted, alkoxy-substituted, nitro-substituted or silane-substituted derivative of the above isocyanates, such as isocyanatopropyltriethoxysilane or isocyanatopropyltrimethoxysilane.

The isocyanate is not limited to the above-mentioned compounds. In addition, the compounds exemplified above can be used alone or in a mixture of two or more.

Component B

The compound having an isocyanate-reactive group can be present in an amount of from 5 to 95% by weight, relative to 100% by weight of the polyurethane polymer.

The group that can be converted to the hydrolyzable group can be one or more selected from the group consisting of: ester groups, carbonate groups, amide groups and anhydride groups, and is most preferably a polyester group.

The composition B) has a melting enthalpy of preferably greater than 15 J/g as measured by DSC-7 from Perkin-Elmer using the first heating curve in a temperature range of from 20 to 100° C. according to DIN65467.

Compound Having an Isocyanate-Reactive Group

The compound having an isocyanate-reactive group can be one or more selected from the group consisting of: hydroxyl-containing compounds, mercapto-containing compounds and amino-containing compounds.

The compound having an isocyanate-reactive group is preferably a hydroxyl-containing compound.

The hydroxyl-containing compound can be one or more of polyester polyols, polyacrylate polyols, urethane polyols, polycarbonate polyols, polyether polyols, polyester polyacrylate polyols, polyurethanes polyacrylate polyols, polyurethanes polyester polyols, polyurethane polyether polyols, polycarbonate polyether polyols, polyurethane polycarbonate polyols and polyester polycarbonate polyols.

The hydroxyl-containing compound is preferably one or more of polycarbonate polyols, polyester polyols and polyether polyols, and most preferably a polycarbonate polyol and/or a polyester polyol.

Polycarbonate Polyol

The polycarbonate polyol can have a number average molecular weight of 400 to 8000 g/mol, and preferably 600 to 3000 g/mol.

The polycarbonate polyol can be selected from the group consisting of hydroxyl-containing polycarbonates, and is preferably a polycarbonate diol.

The polycarbonate diol can be obtained from carbonic acid derivatives, such as diphenyl carbonate or dimethyl carbonate, and polyols, preferably diols.

The diol can be ethylene glycol, 1,2- and 1,3-propanediol, 1,3- and 1,4-butanediol, 1,6-hexanediol, 1,8-octylene glycol, neopentyl glycol, 1,4-dimethylolcyclohexane, 2-methyl-1,3-propanediol, 2,2,4-trimethyl-1,3-pentanediol, dipropylene glycol, polypropylene glycols, dibutylene glycol, polybutylene glycols, bisphenol A, or lactone-modified derivatives of the above diols.

Preferably, the diol comprises from 40 to 100% by weight of hexanediol. The hexanediol is preferably 1,6-hexanediol and/or a hexanediol derivative. The 1,6-hexanediol derivative further comprises an ester or ether group, in addition to the OH end group, and can be obtained by the reaction between hexanediol and an equal or excess amount of caprolactone or by the self-etherification of hexanediol that produces di- or tri-hexanediol.

Polyester Polyol

The polyester polyol can be a linear polyester diol or a slightly branched polyester polyol, prepared from components comprising: aliphatic, alicyclic or aromatic di- or polycarboxylic acids, such as succinic acid, methylsuccinic acid, glutaric acid, adipic acid, pimelic acid, suberic acid, azelaic acid, sebacic acid, nonanedicarboxylic acid, decanedicarboxylic acid, terephthalic acid, isophthalic acid, phthalic acid, tetrahydrophthalic acid, hexahydrophthalic acid, cyclohexanedicarboxylic acid, maleic acid, fumaric acid, malonic acid or trimellitic acid; anhydrides, such as phthalic anhydride, trimellitic anhydride or succinic anhydride or mixtures thereof; and low molecular weight polyols, and optionally higher functional polyols, such as trimethylolpropane, glycerol or pentaerythritol, alicyclic and/or aromatic di- and poly-hydroxy compounds.

The polyester polyol can also be a homopolymer or a mixed polymer of lactones, and is preferably obtained by the addition of a lactone or lactone mixture, such as butyrolactone, ε-caprolactone and/or methyl-ε-caprolactone, to the molecule of a suitable di- and/or higher functional starting agent. The ε-caprolactone is preferably a polymer of ε-caprolactone.

Polycarbonate Polyether Polyol

The polycarbonate polyether polyol can be a polyol based on dimethyl carbonate and hexanediol and/or butanediol and/or ε-caprolactone, and is preferably a polyol based on dimethyl carbonate and hexanediol and/or ε-caprolactone.

Hydroxy-Functional Compound Having a Molecular Weight of 32-400 g/mol

The component B) can further comprise a hydroxy-functional compound having a molecular weight of 32-400 g/mol.

The hydroxy-functional compound having a molecular weight of 32 to 400 g/mol can be a polyol having up to 20 carbon atoms, such as one or more of ethylene glycol, diethylene glycol, triethylene glycol, 1,2-propanediol, 1,3-propanediol, 1,4-butanediol, 1,3-butanediol, cyclohexanediol, 1,4-cyclohexanedimethanol, 1,6-hexanediol, neopentyl glycol, hydroquinone diethylol ether, bisphenol A (2,2-bis(4-hydroxyphenyl)propane), hydrogenated bisphenol A (2,2-bis(4-hydroxycyclohexyl)propane), trimethylolpropane, glycerol and pentaerythritol.

The hydroxy-functional compound having a molecular weight of 32 to 400 g/mol can also be an ester diol, such as α-hydroxybutyl-ε-hydroxyhexanoate, ω-hydroxyhexyl-γ-hydroxybutyrate, β-hydroxyethyl adipate or β-hydroxyethyl terephthalate.

The hydroxy-functional compound having a molecular weight of 32 to 400 g/mol can also be a monofunctional or isocyanate-reactive hydroxy-functional compound. The monofunctional or isocyanate-reactive hydroxy-functional compound can be one or more of ethanol, n-butanol, ethylene glycol monobutyl ether, diethylene glycol monomethyl ether, ethylene glycol monobutyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol, 1-hexadecanol, 1,6-hexanediol, 1,4-butanediol, neopentyl glycol and trimethylolpropane, and is preferably one or more of 1,6-hexanediol, 1,4-butanediol, neopentyl glycol and trimethylolpropane.

Compound Having at Least One Thiol Group

The component B) can further comprise a compound having at least one thiol group, such as methanedithiol, 1,2-ethanedithiol, 1,1-propanedithiol, 1,2-propanediol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropan-1,3-dithiol, 3,4-dimethoxybutan-1,2-dithiol or 2-methylcyclohexan-2,3-dithiol, polythiols containing a thioether group, such as 2,4-dimercaptomethyl-1,5-dimercapto-3-thiapentane, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 5,6-bis(mercaptoethylthio)-1,10-dimercapto-3,8-dithiadecane, 4,5-bis(mercaptoethylthio)-1,10-dimercapto-3,8-dithiadecane, tetrakis(mercaptomethyl)methane, 1,1,3,3-tetrakis(mercaptomethylthio)propane, 1,1,5,5-tetrakis(mercaptomethylthio)-3-thiapentane, 1,1,6,6-tetrakis(mercaptomethylthio)-3,4-dithiahexane, 2-mercaptoethylthio-1,3-dimercaptopropane, 2,3-bis(thio(2-mercaptoethyl))-1-n-propanethiol, 2,2-bis(mercaptomethyl)-1,3-dimercaptopropane, bis(mercaptomethyl) sulfide, bis(mercaptomethyl) disulfide, bis(mercaptoethyl) sulfide, bis(mercaptoethyl) disulfide, bis(mercaptopropyl) sulfide, bis(mercaptopropyl) disulfide, bis(mercaptomethylthio)methane, tri(mercaptomethylthio)methane, bis(mercaptoethylthio)methane, tri(mercaptoethylthio)methane, bis(mercaptopropylthio)methane, 1,2-bis(mercaptomethylthio)ethane, 1,2-bis(mercaptoethylthio)ethane, 2-mercaptoethylthio)ethane, 1,3-bis(mercaptomethylthio)propane, 1,3-bis(3-mercaptopropylthio)propane, 1,2,3-tris(mercaptomethylthio)propane, 1,2,3-tris(mercaptoethylthio)propane, 1,2,3-tris(mercaptopropylthio)propane, tetrakis(mercaptoethylthiomethyl)methane, tetrakis(mercaptopropylthiomethyl)methane, 2,5-dimercapto-1,4-dithiane, 2,5-bis(mercaptomethyl)-1,4-dithiane and oligomers thereof obtainable according to JP-A 07118263, 1,5-bis(mercaptopropyl)-1,4-dithiane, 1,5-bis(2-mercaptoethylthiomethyl)-1,4-dithiane, 2-mercaptomethyl-6-mercapto-1,4-dithiacycloheptane, 2,4,6-trimercapto-1,3,5-trithiane, 2,4,6-trimercaptomethyl-1,3,5-trithiane or 2-(3-bis(mercaptomethyl)-2-thiapropyl)-1,3-dithiacyclopentane, polyester thiols, such as ethyleneglycol bis(2-mercaptoacetate), ethyleneglycol bis(3-mercaptopropionate), diethyleneglycol (2-mercaptoacetate), diethyleneglycol (3-mercaptopropionate), 2,3-dimercapto-1-propanol (3-mercaptopropionate), 3-mercapto-1,2-propanediol bis(2-mercaptoacetate), 3-mercapto-1,2-propanediol bis(3-mercaptopropionate), trimethylolpropane-tris(2-mercaptoacetate), trimethylolpropane-tris(3-mercaptopropionate), trimethylolethane-tris(2-mercaptoacetate), trimethylolethane-tris(3-mercaptopropionate), pentaerythritol tetrakis(2-mercaptoacetate), pentaerythritol tetrakis(3-mercaptopropionate), glyceride tris(2-mercaptoacetate), glyceride tris(3-mercaptopropionate), 1,4-cyclohexanediol bis(2-mercaptoacetate), 1,4-cyclohexanediol bis(3-mercaptopropionate), hydroxymethylsulfide-bis(2-mercaptoacetate), hydroxymethylsulfide-bis(3-mercaptopropionate), hydroxyethylsulfide (2-mercaptoacetate), hydroxyethylsulfide (3-mercaptopropionate), hydroxymethyldisulfide (2-mercaptoacetate), hydroxymethyldisulfide (3-mercaptopropionate), (2-mercaptoethyl)thiohydroxyacetate or bis(2-mercaptoethyl) thiodipropionate, and aromatic thio-compounds, such as 1,2-dimercaptobenzene, 1,3-dimercaptobenzene, 1,4-dimercaptobenzene, 1,2-bis(mercaptomethyl)-benzene, 1,4-bis(mercaptomethyl)benzene, 1,2-bis(mercaptoethyl)benzene, 1,4-bis-(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,3,5-tris(mercaptoethyl)benzene, 1,2,4-tris (mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 2,2'-dimercaptobiphenyl or 4,4'-dimercaptobiphenyl. The mercapto-functional compounds can be used alone or in any mixture thereof.

The component B) can further comprise one or more of the following compounds: mono-, di-, tri-functional amines and/or mono-, di-, tri-functional hydroxylamines, aliphatic and/or alicyclic primary and/or secondary monoamines, such as ethylamine, diethylamine, isopropylamine, butylamine, cyclohexylamine, aminoalcohols, such as ethanolamine, N-methylethanolamine, diethanolamine, diisopropanolamine, 1,3-diamino-2-propanol, N-(2-hydroxyethyl)-ethylenediamine, N,N-bis(2-hydroxyethyl)ethylenediamine, 2-propanolamine, diamines or triamines, such as 1,2-ethanediamine, 1,6-hexanediamine, 1-amino-3,3,5-trimethyl-5-aminomethylcyclohexane (isophorone diamine), piperazine, 1,4-diaminocyclohexane, bis-(4-aminocyclohexyl)-methane and diethylenetriamine, adipic acid dihydrazide, hydrazine or hydrazine hydrate, and preferably comprises one or more of 1,2-ethylenediamine, 1-amino-3,3,5-trimethyl-5-aminomethylcyclohexane (isophorone diamine), diethylenetriamine, diethanolamine, ethanolamine, N-(2-hydroxyethyl)-ethylenediamine and N,N-bis(2-hydroxyethyl)ethylenediamine.

Component C)

The emulsifier of component C) includes latent emulsifiers.

The emulsifier of component C) can comprise at least one isocyanate-reactive group and at least one emulsifying group or latent emulsifying group.

The isocyanate-reactive group can be one or more selected from the group consisting of hydroxyl, mercapto and amine groups.

The emulsifying group or the latent emulsifying group can be one or more selected from the group consisting of sulfonic acid group, carboxylic acid group, tertiary amino group and hydrophilic polyether.

The emulsifier comprising a sulfonic acid group and/or a carboxylic acid group can be selected from the group consisting of diamino compounds or dihydroxyl compounds containing a sulfonic acid group and/or a carboxylic acid group, such as sodium, potassium, lithium, and tertiary amine salts of N-(2-aminoethyl)-2-aminoethanesulfonic acid, N-(3-aminopropyl)-2-aminoethanesulfonic acid, N-(3-aminopropyl)-3-aminopropanesulfonic acid, N-(2-aminoethyl)-3-aminopropanesulfonic acid, similar carboxylic acids, dimethylolpropionic acid or dimethylolbutanoic acid, and is preferably N-(2-aminoethyl)-2-aminoethanesulfonate or dimethylolpropionic acid.

The sulfonic acid or carboxylic acid groups can be used directly in the form of their salts, such as sulfonates or carboxylates.

The sulfonic acid group or the carboxylic acid group can also be obtained by partial or complete addition of a neutralizing agent during or after the process for preparing the polyurethane polymer.

The neutralizing agent for salt formation can be selected from the group consisting of triethylamine, dimethylcyclohexylamine, ethyl diisopropylamine, ammonia, diethanolamine, triethanolamine, dimethylethanolamine, methyldiethanolamine, aminomethylpropanol, and mixtures thereof, and is preferably triethylamine, dimethylcyclohexylamine, ethyl diisopropylamine. Other neutralizing agents, such as sodium hydroxide, potassium hydroxide, lithium hydroxide or calcium hydroxide, can also be used.

The hydrophilic polyether can be selected from the group consisting of hydroxyl-functionalized polyethers based on ethylene oxide or based on ethylene oxide and propylene oxide, methoxypolyethylene glycol having a molecular weight of from 350 to 3000 g/mol, ethoxypolyethylene glycol, butoxypolyethylene glycol, Carbowax® MPEG 750, MPEG 550, MPEG 350 (available from Dow Chemical, USA), polyether LB 25 (available from Covestro, Germany) and corresponding amino-functional polyethers.

Component D)

The solvent can be selected from the group consisting of acetone, 2-butanone, tetrahydrofuran, xylene, toluene, cyclohexane, butyl acetate, dioxane acetate, methoxypropyl acetate, N-methylpyrrolidone, N-ethylpyrrolidone, acetonitrile, dipropylene glycol dimethyl ether or a solvent containing an ether or ester moiety, and is preferably acetone, 2-butanone.

The solvent can be added fully at the beginning of the production, or a portion thereof can be further added as needed during the production.

Component E)

The reactive diluent can be selected from acrylic acids and/or acrylates. The acrylate is preferably a methacrylate.

External Emulsifier

The polyurethane polymer can further comprise an external emulsifier component. The external emulsifier can be selected from fatty alcohol polyethers, and preferably aliphatic ethylene glycol polyethers or aliphatic propylene glycol polyethers.

Water-Soluble Salt of a Chelating Agent

The water-soluble salt of a chelating agent refers to a compound capable of forming a stable complex with metal ions, in particular heavy metal ions or transition metal ions.

The solubility of a suitable water-soluble salt of a chelating agent in water is not less than 0.15 g/100 g of water, as measured at the room temperature of 20° C.

The solubility of a preferred water-soluble salt of a chelating agent in water is not less than 1 g/100 g of water, as measured at the room temperature of 20° C.

The water-soluble salt of the chelating agent is preferably present in amount of 0.04 to 0.5% by weight, more preferably 0.05 to 0.4% by weight, and most preferably 0.1 to 0.2% by weight, relative to 100% by weight of the polyurethane polymer.

The water-soluble salt of the chelating agent is preferably satisfying with a following relationship, when the water-soluble salt of the chelating agent is present in an aqueous solution in an amount of $4.3*10^{-7}$ mol/g, the aqueous solution has a pH value of greater than 4, preferably greater than 6, and most preferably greater than 9.

The change of the pH within 24 hours of the composition containing the water-soluble salt of the chelating agent is preferably between −1 and 1.5, more preferably between −0.5 and 1.2, and most preferably between 0 and 0.5.

The water-soluble salt of the chelating agent can be one or more of ethylenediamine tetraacetate, tartrate, citrate, pyrophosphate, tripolyphosphate, hexametaphosphate and gluconate.

The water-soluble monovalent salt of the chelating agent is preferably present in an amount of not less than 45% by weight, relative to 100% by weight of the water-soluble salt of the chelating agent.

The water-soluble monovalent salt of the chelating agent can be one or more selected from the group consisting of monovalent ethylenediamine tetraacetate, monovalent tartrate, monovalent citrate, monovalent pyrophosphate, monovalent tripolyphosphate, monovalent hexametaphosphate, monovalent aminotrimethylene phosphonate, monovalent ethylenediamine tetramethylidene phosphonate, monovalent diethylenetriamine pentamethylene phosphonate and monovalent gluconate, preferably one or more selected from the group consisting of monovalent ethylenediamine tetraacetate, monovalent tartrate, monovalent citrate, monovalent pyrophosphate, monovalent tripolyphosphate, monovalent hexametaphosphate, and monovalent gluconate, and is most preferably a monovalent ethylenediamine tetraacetate and/or monovalent pyrophosphate.

The monovalent ethylenediamine tetraacetate can be one or more of disodium ethylenediamine tetraacetate, trisodium ethylenediamine tetraacetate, tetrasodium ethylenediamine tetraacetate, diammonium ethylenediaminetetraacetate, dipotassium ethylenediamine tetraacetate, and tetrapotassium ethylenediamine tetraacetate, and is most preferably tetrasodium ethylenediamine tetraacetate and/or tetrapotassium ethylenediamine tetraacetate.

The monovalent tartrate can be sodium potassium tartrate.

The monovalent citrate can be triammonium citrate.

The monovalent pyrophosphate can be tetrasodium pyrophosphate.

The water-soluble salt of the chelating agent can further comprise a water-soluble polyvalent salt of a chelating agent. The water-soluble polyvalent salt of the chelating agent can be one or more selected from the group consisting of magnesium pyrophosphate, magnesium citrate, calcium gluconate, magnesium gluconate and magnesium tartrate.

The water-soluble polyvalent salt of the chelating agent is preferably present in an amount of less than 70% by weight, relative to 100% by weight of the water-soluble salt of the chelating agent.

The water-soluble monovalent salt of the chelating agent and the water-soluble polyvalent salt of the chelating agent can be added in the form of a separate compound or a compound salt containing a water-soluble monovalent salt of a chelating agent and a water-soluble polyvalent salt of a chelating agent, such as disodium magnesium ethylenediamine tetraacetate and disodium calcium ethylenediamine tetraacetate. When added in the form of a compound salt, the amount of the water-soluble monovalent salt of the chelating agent can be calculated as follows: Σ molar mass of the monovalent ion*number of the monovalent ion/(Σ molar mass of the polyvalent ion*number of the polyvalent ion+Σ molar mass of the monovalent ion*number of the monovalent ion). For example, the amount of the water-soluble monovalent salt in the disodium magnesium ethylenediamine tetraacetate calculation can be calculated as follows: 23*2/(23*2+24)=65.7%.

Stabilizer

The composition can further comprise a stabilizer. The stabilizer is helpful in mitigating the hydrolysis of the hydrolyzable group and prolonging the shelf life of the composition.

The stabilizer can be one or more of carbodiimide compounds, epoxy compounds, oxazoline compounds and aziridine compounds.

The stabilizer can be present preferably in amount of 0.5 to 10% by weight, preferably 0.5 to 2% by weight, relative to 100% by weight of the polyurethane polymer.

The composition can be a coating material, a sealant or an adhesive.

The composition can further comprise an additive. The additive can be one or more selected from the group consisting of co-adhesives, thickeners, adhesion promoters, lubricants, wetting additives, dyes, light stabilizers, aging inhibitors, pigments, flow control agents, antistatic agents, UV absorbers, film forming auxiliaries, defoamers and plasticizers.

The composition can further comprise a polymer different from the polyurethane polymer, such as a polyester polymer, a polyurethane-polyacrylate polymer, a polyacrylate polymer, a polyether polymer, a polyester-polyacrylate polymer, an alkyd resin, a polyamide/imide polymer or a polyepoxide polymer. Preferably, the polymer different from the polyurethane polymer comprises a hydrolyzable group.

The coating material, adhesive or sealant of the present invention can be obtained using methods known in the area of coatings, adhesives or sealants for their processing and usage.

Preferably, after being dried and formed into a film, the composition has a melting enthalpy of greater than 15 J/g as measured by DSC using the first heating curve in a temperature range of from 20 to 100° C. according to DIN65467.

Production of the Composition

Water and the polyurethane polymer can be formed into an aqueous polyurethane dispersion, and then the water-soluble salt of the chelating agent can be incorporated to produce the composition.

The water-soluble salt of the chelating agent can be mixed with the component B) or component C) for the production of the polyurethane polymer, and then mixed with other reactive components for the production of the polyurethane polymer to produce the composition. The water-soluble salt of the chelating agent is preferably mixed with the component B) or component C for the production of the polyurethane polymer in the presence of water.

The water in the composition can be introduced prior to the formation of the polyurethane polymer, during the formation of the polyurethane polymer, or after the formation of the polyurethane polymer. The water is preferably introduced after the formation of the polyurethane polymer.

The term "aqueous polyurethane dispersion" is also used as a synonym for aqueous polyurethaneurea dispersions and/or aqueous polyurethane polyurea dispersions and/or aqueous polyurea dispersions.

Catalyst, such as dibutyltin dilaurate, can be added in the production of the polyurethane polymer.

The polyurethane polymer can be prepared using the prepolymer mixing method, the acetone method or the melt dispersion method, and is preferably prepared using the acetone method.

The mixing of the reactive components of the polyurethane polymer can be conducted in a conventional order.

For example, the polyurethane polymer can be obtained by mixing and reacting the reactive components including the component A), the component B) and the component C).

For example, the polyurethane polymer can also be obtained by mixing and polymerizing the component A), the component B) and optionally the component C), followed by introduction of the component D). After the polymerization, the component E) can be further introduced.

For example, the polyurethane polymer can also be obtained by mixing the component A), the component B) and the component C), and incorporating the resultant into the component D) and/or the component E, respectively.

For example, the polyurethane polymer can also be obtained by mixing the component A) and the component B), and polymerizing in the presence of the component D) and/or the component E), followed by introduction of the component C) and optionally the component B).

The component A), component B) or component C) can be added in one portion or in divided portions, and its composition can be the same as or different from the previously added one.

The component E) is preferably present in the composition in the form of a polymer with a monomer content of not more than 10%, relative to 100% by weight of the composition.

The organic solvent present in the polyurethane polymer can be removed by distillation. The organic solvent can be removed during the formation of the polyurethane polymer, or after the formation of the polyurethane polymer.

The residual amount of the organic solvent in the polyurethane polymer is preferably less than 1.0% by weight, relative to 100% by weight of the composition.

The water-soluble salt of the chelating agent can be added in the form of a solid or an aqueous solution. Preferably, the water-soluble salt of the chelating agent is added in the form of an aqueous solution thereof, which will further facilitate the dispersion of the water-soluble salt of the chelating agent.

The water-soluble salts of the chelating agent can be added directly, or can be formed in the composition via acid-base neutralization. The acid-base neutralization can be full or partial neutralization, and is preferably full neutralization.

The acid can be a free acid capable of being neutralized by reacting with a base to form the water-soluble salt of the chelating agent. The free acid can be one or more selected from the group consisting of aminocarboxylic acid, hydroxycarboxylic acid, inorganic polyphosphoric acid, hydroxyaminocarboxylic acid, organic polyphosphonic acid and polycarboxylic acid.

The aminocarboxylic acid can be ethylenediaminetetraacetic acid and/or aminotriacetic acid.

The hydroxycarboxylic acid can be one or more selected from the group consisting of: tartaric acid, citric acid and gluconic acid.

The inorganic polyphosphoric acid can be one or more selected from the group consisting of: tripolyphosphoric acid, hexametaphosphoric acid and pyrophosphoric acid.

The hydroxyaminocarboxylic acid can be hydroxyethyl ethylenediamine triacetic acid and/or dihydroxyethylglycine.

Coated Articles

When used as a coating material, the composition is suitable for use on any substrate known in the coating field, such as metals and alloys, woods, wood-based materials, particleboards, medium-density fiberboards, ceramics, stones, concretes, asphalts, hard fibers, glasses, glass fibers, carbon fibers, carbon nanotubes, porcelains, plastics, leathers, textiles and/or textile fibers.

When used as an adhesive, the composition is suitable for use on any substrate known in the adhesive field, such as paper, cardboards, woods, textiles, metals, alloys, fabrics, fibers, artificial leathers, leathers or inorganic materials, and is also useful for bonding rubber materials, such as natural and synthetic rubbers, various plastics, such as polyurethane, polyvinyl acetate, polyvinyl chloride, especially plasticizer-containing polyvinyl chloride, and is further useful for bonding thermoplastics, such as ABS (acrylate-butadiene-styrene), PC (polycarbonate) and mixtures thereof, and polyolefin plastics, optionally after a suitable pretreatment.

The composition is also useful for the bonding process involved in the production of shoe soles, especially for the bonding between the rubber- and polyvinyl chloride-based material and the upper made of leather or artificial leather. The composition produced according to the present invention is also particularly useful for the bonding of black rubber-based substrate.

Process for the Production of Coated Articles

The coating can be applied by spray coating, for example, by airtight spraying, airless spraying or electrostatic spraying, or by painting, roll coating, dip coating, injection, printing, knife coating or the like.

EXAMPLES

All percentages mentioned in the present invention are expressed as a percentage by weight, unless otherwise stated.

The analyses and measurements of the present invention were carried out at 23° C., unless otherwise stated.

Viscosity was measured using DV-II+Pro. Rotational Viscometer from Brookfield according to DIN 53019 at 23° C.

The solid content of the aqueous polyurethane dispersion was measured using HS153 Moisture Analyzer from Mettler Toledo according to DIN-EN ISO 3251.

The isocyanate group (NCO) content was determined by volume according to DIN-EN ISO 11909.

The pH was measured at 23° C. using a PB-10 pH meter from Sartorius, Germany.

The melting enthalpy was measured at 20-100° C. using Q20DSC from TA according to DIN 65467, and the results were taken from the first heating curve, unless otherwise stated.

Starting Materials and Reagents

Dispercoll U58: an aliphatic aqueous polyurethane dispersion available from COVESTRO DEUTSCHLAND AG, having a polyurethane polymer content of 50±1%, a pH of 6-9, and a polyurethane polymer melting enthalpy of 46.1 J/g.

Dispercoll U62: an aliphatic aqueous polyurethane dispersion available from COVESTRO DEUTSCHLAND AG, having a polyurethane polymer content of 48±1%, a pH of 6-9, and a polyurethane polymer melting enthalpy of 41.0 J/g.

Polyester I: poly(1,4-butylene adipate) available from COVESTRO DEUTSCHLAND AG, having a OH value=50, and a melting enthalpy of 91.0 J/g, as measured at 20-100° C. using DSC-7 from Perkin-Elmer according to DIN 65467, with the results being taken from the first heating curve, used as the compound of component B) containing an isocyanate-reactive group.

Polyester II: a polyester diol consisting of 1,6-hexanediol, neopentyl glycol and adipic acid available from COVESTRO DEUTSCHLAND AG, having a OH value=66, and a melting enthalpy of 55 J/g, as measured at 20-100° C. using DSC-7 from Perkin-Elmer according to DIN 65467, with the results being taken from the first heating curve, used as the compound of component B) containing an isocyanate-reactive group.

Desmodur® H: 1,6-hexamethylene diisocyanate available from COVESTRO DEUTSCHLAND AG, used as the isocyanate component A).

Desmodur® I: isophorone diisocyanate available from COVESTRO DEUTSCHLAND AG, used as the isocyanate component A).

Emulsifier FD®: fatty alcohol poly(ethylene-glycol/propylene-glycol) ether available from LANXESS, Germany, used as an external emulsifier.

Desmodur 2802 XP: an aqueous carbodiimide dispersion available from COVESTRO DEUTSCHLAND AG, being a nonionic hydrophilic alicyclic carbodiimide (40 wt % aqueous solution) with a carbodiimide equivalent weight of about 385, used as a stabilizer.

Disodium ethylenediamine tetraacetate (EDTA2Na): available from Sinopharm Group Chemical Reagent Co., Ltd., in an aqueous solution of disodium ethylenediamine tetraacetate, having a pH of 4.77 at a disodium ethylenediamine tetraacetate content of $4.3*10^{-7}$ mol/g, and a solubility of 11.1 g/100 g as measured at room temperature of 20° C., used as the water-soluble monovalent salt of the chelating agent.

Disodium magnesium ethylenediamine tetraacetate (EDTA2NaMg): available from Sinopharm Group Chemical Reagent Co., Ltd., in an aqueous solution of disodium magnesium ethylenediamine tetraacetate, having a pH of 6.38 at a disodium magnesium ethylenediamine tetraacetate content of $4.3*10^{-7}$ mol/g, and a solubility of 90 g/100 g as measured at room temperature of 20° C., used as the water-soluble polyvalent salt of the chelating agent.

Tetrasodium ethylenediamine tetraacetate (EDTA4Na): available from Sinopharm Group Chemical Reagent Co., Ltd., in an aqueous solution of tetrasodium ethylenediamine tetraacetate, having a pH of 10.35 at a tetrasodium ethylenediamine tetraacetate content of $4.3*10^{-7}$ mol/g, and a solubility of 100 g/100 g as measured at room temperature of 20° C., used as the water-soluble monovalent salt of the chelating agent.

Nitrilotriacetic acid: available from Sinopharm Group Chemical Reagent Co., Ltd., in an aqueous solution of nitrilotriacetic acid, having a pH of 2.92 at a nitrilotriacetic acid content of $4.3*10^{-7}$ mol/g, and a solubility of <0.01 g/100 g as measured at room temperature of 20° C.

Sodium pyrophosphate: available from Sinopharm Group Chemical Reagent Co., Ltd., in an aqueous solution of sodium pyrophosphate, having a pH of 9.89 at a sodium pyrophosphate content of $4.3*10^{-7}$ mol/g, and a solubility of 6.2 g/100 g as measured at room temperature of 20° C.

Production of the Composition

Examples 1-9

According to Table 1, the water-soluble salt of the chelating agent was added to a commercially available aqueous polyurethane dispersion, and the mixture was homogeneously stirred or shaken to obtain a composition.

Examples 10-1 to 10-6

According to Table 1 and as described below, polyurethane polymers and compositions were produced after mixing the water-soluble salt of the chelating agent with the components for the production of the polyurethane polymer.

Example 10-1

540 g of polyester I and 51 g of polyester II were dehydrated at 110° C. under 15 mbar for 1 hour, and 2.7 g of 1,4-butanediol was added and cooled while stirring. 45.4 g of Desmodur®H was added at 60° C., followed by the addition of 30 g of Desmodur® I, and the resultant was stirred at 80-90° C. until an isocyanate content of 1.3% was obtained. Then, the mixture was dissolved in 930 g of acetone and cooled to 50° C., providing a reaction solution. A solution of 13.6 g of sodium N-(2-aminoethyl)-2-aminoethanesulfonate, 0.8 g of diethanolamine, 1 g of ethylenediamine and 13.67 g of 10% aqueous solution of tetrasodium ethylenediamine tetraacetate in 80 g of water was added to the reaction solution and stirred vigorously for 30 minutes. After that, 700 g of water was added to disperse, followed by distillation for acetone removal, and then 6 g of Emulsifier FD® was added, to obtain a composition.

Example 10-2

540 g of polyester I and 51 g of polyester II were dehydrated at 110° C. under 15 mbar for 1 hour, and 2.7 g of 1,4-butanediol was added and cooled while stirring. 45.4 g of Desmodur®H was added at 60° C., followed by the addition of 30 g of Desmodur®I, and the resultant was stirred at 80-90° C. until an isocyanate content of 1.3% was obtained. Then, the mixture was dissolved in 930 g of acetone and cooled to 50° C., providing a reaction solution. A solution of 13.6 g of sodium N-(2-aminoethyl)-2-aminoethanesulfonate, 0.8 g of diethanolamine and 1 g of ethylenediamine in 80 g of water was added to the reaction solution and stirred vigorously for 30 minutes. After that, 13.67 g of 10% aqueous solution of tetrasodium ethylenediamine tetraacetate was added, and then 700 g of water was added to disperse, followed by distillation for acetone removal, and the addition of 6 g of Emulsifier FD®, to obtain a composition.

Example 10-3

540 g of polyester I and 51 g of polyester II were dehydrated at 110° C. under 15 mbar for 1 hour, and 2.7 g of 1,4-butanediol was added and cooled while stirring. 45.4 g of Desmodur®H was added at 60° C., followed by the addition of 30 g of Desmodur®I, and the resultant was stirred at 80-90° C. until an isocyanate content of 1.3% was obtained. Then, the mixture was dissolved in 930 g of acetone and cooled to 50° C., providing a reaction solution. A solution of 13.6 g of sodium N-(2-aminoethyl)-2-aminoethanesulfonate, 0.8 g of diethanolamine and 1 g of ethylenediamine in 80 g of water was added to the reaction solution and stirred vigorously for 30 minutes. After that, 700 g of water was added to disperse, and then 13.67 g of 10% aqueous solution of tetrasodium ethylenediamine tetraacetate was added, followed by distillation for acetone removal, and the addition of 6 g of Emulsifier FD®, to obtain a composition.

Example 10-4

540 g of polyester I and 51 g of polyester II were dehydrated at 110° C. under 15 mbar for 1 hour, and 2.7 g of 1,4-butanediol was added and cooled while stirring. 45.4 g of Desmodur®H was added at 60° C., followed by the addition of 30 g of Desmodur®I, and the resultant was stirred at 80-90° C. until an isocyanate content of 1.3% was obtained. Then, the mixture was dissolved in 930 g of acetone and cooled to 50° C., providing a reaction solution. A solution of 13.6 g of sodium N-(2-aminoethyl)-2-aminoethanesulfonate, 0.8 g of diethanolamine, 1 g of ethylenediamine and 1.37 g of tetrasodium ethylenediamine tetraacetate in 80 g of water was added to the reaction solution and stirred vigorously for 30 minutes. After that, 700 g of water was added to disperse, followed by distillation for acetone removal, and then 6 g of Emulsifier FD® was added, to obtain a composition.

Example 10-5

540 g of polyester I and 51 g of polyester II were dehydrated at 110° C. under 15 mbar for 1 hour, and 2.7 g of 1,4-butanediol was added and cooled while stirring. 45.4 g of Desmodur®H was added at 60° C., followed by the addition of 30 g of Desmodur®I, and the resultant was stirred at 80-90° C. until an isocyanate content of 1.3% was obtained. Then, the mixture was dissolved in 930 g of acetone and cooled to 50° C., providing a reaction solution. A solution of 13.6 g of sodium N-(2-aminoethyl)-2-aminoethanesulfonate, 0.8 g of diethanolamine, and 1 g of ethylenediamine in 80 g of water was added to the reaction solution and stirred vigorously for 30 minutes. After that, 700 g of water containing 1.37 g of dissolved tetrasodium ethylenediamine tetraacetate was added to disperse, followed by distillation for acetone removal, and then 6 g of Emulsifier FD® was added, to obtain a composition.

Examples 10-6

540 g of polyester I and 51 g of polyester II were dehydrated at 110° C. under 15 mbar for 1 hour, and 2.7 g of 1,4-butanediol was added and cooled while stirring. 45.4 g of Desmodur®H was added at 60° C., followed by the addition of 30 g of Desmodur®I, and the resultant was stirred at 80-90° C. until an isocyanate content of 1.3% was obtained. Then, the mixture was dissolved in 930 g of acetone and cooled to 50° C., providing a reaction solution. A solution of 13.6 g of sodium N-(2-aminoethyl)-2-aminoethanesulfonate, 0.8 g of diethanolamine, and 1 g of ethylenediamine in 80 g of water was added to the reaction solution and stirred vigorously for 30 minutes. After that, 700 g of water was added to disperse, followed by distillation for acetone removal, with 13.67 g of 10% aqueous solution of tetrasodium ethylenediamine tetraacetate being added during the distillation, and then 6 g of Emulsifier FD® was added, to obtain a composition.

Comparative Examples 1, 2, 4

The components as listed in Table 1 were mixed, and the mixture was homogeneously stirred or shaken to obtain a composition.

Comparative Example 3

According to Table 1, the chelating agent in the form of an acid was added to a commercially available aqueous polyurethane dispersion, and the mixture was homogeneously stirred or shaken to obtain a composition.

Comparative Example 5

A composition was prepared according to Table 1 and as described below. 540 g of polyester I and 51 g of polyester II were dehydrated at 110° C. under 15 mbar for 1 hour, and 2.7 g of 1,4-butanediol was added and cooled while stirring. 45.4 g of Desmodur®H was added at 60° C., followed by the addition of 30 g of Desmodur®I, and the resultant was stirred at 80-90° C. until an isocyanate content of 1.3% was obtained. Then, the mixture was dissolved in 930 g of acetone and cooled to 50° C., providing a reaction solution. A solution of 13.6 g of sodium N-(2-aminoethyl)-2-aminoethanesulfonate, 0.8 g of diethanolamine, and 1 g of ethylenediamine in 80 g of water was added to the reaction solution and stirred vigorously for 30 minutes. After that, 700 g of water was added to disperse, followed by distillation for acetone removal, and then 6 g of Emulsifier FD® was added, providing an aqueous polyurethane dispersion, i.e. the composition of this comparative example.

Comparative Example 6-7

According to Table 1, the water-soluble salt of the chelating agent was added to a commercially available aqueous polyurethane dispersion, and the mixture was homogeneously stirred or shaken to obtain a composition.

Performance Determination

Viscosity Test Method I

The compositions obtained in the Examples according to the invention and the Comparative Examples were stored under room temperature for 4.5 or 6.5 months, and then poured separately into a container made of polytetrafluoroethylene, and the mixture was completely dried at room temperature after stirring. 10 g of the dried composition was weighed and dissolved in 100 g of dimethylformamide (DMF), and the mixture was sufficiently shaken at room temperature until it was completely dissolved to give a solution having a concentration of 9.1%. The viscosity of the solution was measured using DV-II+Pro viscometer from Brookfield at a rotary speed of 30 rpm and room temperature. The results are shown in Table 2.

Viscosity Test Method II

The compositions obtained in the Examples according to the invention and the Comparative Examples were stored under room temperature for 4.5 or 6.5 months, and then poured separately into a container made of polytetrafluoroethylene, and the mixture was completely dried at room temperature after stirring. 8 g of the dried composition was weighed and dissolved in 100 g of N-methylpyrrolidone (NMP), and the mixture was sufficiently shaken at room temperature until it was completely dissolved to give a solution having a concentration of 8.7%. The viscosity of the solution was measured using DV-II+Pro viscometer from Brookfield at a rotary speed of 30 rpm and room temperature. The results are shown in Table 2.

Heat Resistance Test

Preparation of the Coating

A piece of black rubber with a length of 100 mm and a width of 20 mm was mechanically polished, coated with a rubber treatment agent (e.g., trichloroisocyanuric acid (B powder) dissolved in ethyl acetate), dried, and then coated by brush with the adhesives containing the compositions of the Examples according to the invention and the Comparative Examples (with the aqueous polyurethane dispersion in the compositions being stored at 50° C. for 4 weeks, 2 months, 2.5 months, 3 months, 4 months or 6 months prior to the preparation of the adhesives). The coated material was heated at 60° C. for 3 minutes for drying and heat activation, and then bonded under a pressure of 4 bar for 10 seconds.

Initial Heat Resistance

After the coating was finished, the sample was stored at room temperature (23±2° C., 50±5% RH) for 2 minutes. The test method was as follows: 500 g weight was loaded and the sample was kept at 80° C. for 30 minutes. The pull-apart distance of the sample was recorded after being kept at 80° C. for 30 minutes, and if a full debonding of the coating occurred before 30 minutes, the full-debonding time was recorded, the results shown in Table 3.

The pull-apart distance was determined using a calibrated scale by measuring the length of the detached part of the sample in the bonded area. The full debonding occurred when the bonded area of the sample was fully detached.

TABLE 1

Compositions obtained in the Examples according to the invention and the Comparative Examples

| | Amount of the polyurethane polymer by weight (g) | | Content of the water-soluble salt of the chelating agent (%) | | | | |
|---|---|---|---|---|---|---|---|
| | U58 | U62 | EDTA2Na | EDTA4Na | EDTA2NaMg | Sodium pyrophosphate | Nitrilotriacetic acid |
| Ex. 1 | 48.66 | | | 0.2 | | | |
| Ex. 2 | 48.66 | | | | 0.2 | | |
| Ex. 3 | | 48.21 | | 0.1 | | | |
| Ex. 4 | | 48.21 | | 0.4 | | | |
| Ex. 5 | | 48.22 | 0.2 | | | | |
| Ex. 6 | | 48.22 | | 0.2 | | | |
| Ex. 7 | | 48.22 | | | | 0.2 | |
| Ex. 8 | | 47.46 | 0.2 | | | | |
| Ex. 9 | | 47.46 | | 0.2 | | | |
| Ex. 10-1 | | 684.5 | | 0.2 | | | |
| Ex. 10-2 | | 684.5 | | 0.2 | | | |
| Ex. 10-3 | | 684.5 | | 0.2 | | | |

TABLE 1-continued

Compositions obtained in the Examples according to the invention and the Comparative Examples

| | | | | | |
|---|---|---|---|---|---|
| Ex. 10-4 | | 684.5 | 0.2 | | |
| Ex. 10-5 | | 684.5 | 0.2 | | |
| Ex. 10-6 | | 684.5 | 0.2 | | |
| Comp. Ex. 1 | 48.66 | | | | |
| Comp. Ex. 2 | | 48.21 | | | |
| Comp. Ex. 3 | | 48.22 | | | 0.08 |
| Comp. Ex. 4 | | 47.46 | | | |
| Comp. Ex. 5 | | | 684.5 | | |
| Comp. Ex. 6 | | 48.21 | | 2 | |
| Comp. Ex. 7 | | 48.21 | | 0.0 | |

| | Content of the stabilizer XP2802 | pH value of the aqueous solution of the water-soluble salt of the chelating agent (measured at a content of $4.3 \times 10^{-7}$ mol/g) | Change of pH value of the composition within 24 hours | Melting temperature of the composition, after being dried and formed into a film (°C.) | Melting enthalpy of the composition, after being dried and formed into a film (J/g) |
|---|---|---|---|---|---|
| Ex. 1 | | 10.35 | −0.7 | 51.9 | 45.5 |
| Ex. 2 | | 6.38 | 0.21 | | |
| Ex. 3 | | 10.35 | | | |
| Ex. 4 | | 10.35 | | | |
| Ex. 5 | | 4.77 | −0.91 | | |
| Ex. 6 | | 10.35 | 0.03 | 46.9 | 43.9 |
| Ex. 7 | | 9.89 | 0.05 | | |
| Ex. 8 | 2 | 4.77 | | | |
| Ex. 9 | 2 | 10.35 | | 47.2 | 43.9 |
| Ex. 10-1 | | 10.35 | 0.17 | | |
| Ex. 10-2 | | 10.35 | 0.14 | | |
| Ex. 10-3 | | 10.35 | 0.21 | | |
| Ex. 10-4 | | 10.35 | 0.29 | | |
| Ex. 10-5 | | 10.35 | 0.27 | | |
| Ex. 10-6 | | 10.35 | 0.22 | | |
| Comp. Ex. 1 | | | | 52.3 | 46.1 |
| Comp. Ex. 2 | | | | 47.7 | 41.0 |
| Comp. Ex. 3 | | 2.92 | −2.4 | | |
| Comp. Ex. 4 | 2 | | | | |
| Comp. Ex. 5 | | | | | |
| Comp. Ex. 6 | | Flocculated, not applicable | | | |
| Comp. Ex. 7 | | 10.35 | 0.03 | | |

TABLE 2

Viscosities of solutions formed from the compositions obtained in the Examples according to the invention and the Comparative Examples

| | Viscosity of the solution (mPa·s) | | | |
|---|---|---|---|---|
| | Solution made of DMF and composition stored for 6.5 months | Solution made of NMP and composition stored for 6.5 months | Solution made of DMF and composition stored for 4.5 months | Solution made of NMP and composition stored for 4.5 months |
| Ex. 1 | 353 | 490 | | |
| Ex. 2 | 329 | 496 | | |
| Ex. 3 | | | 399 | 555 |
| Ex. 4 | | | 427 | 488 |
| Ex. 5 | 261 | 363 | | |
| Ex. 6 | 281 | 592 | | |
| Ex. 7 | 349 | 593 | | |
| Comp. Ex. 1 | 147 | 220 | | |
| Comp. Ex. 2 | 219 | 294 | 219 | 307 |
| Comp. Ex. 3 | 17 | 31 | | |

When the structure, temperature, solvent and concentration of the solutions as described above are fixed, their viscosities depend on the molecular weight of the polyurethane polymers present in the compositions within the solutions. A high viscosity indicates a high molecular weight of the polyurethane polymer present in the composition.

A comparison of the viscosities observed with the compositions of Example 1, Example 2 and Comparative Example 1 shows that, the viscosities of solutions prepared with compositions of the Examples after storage for 6.5 months are much higher than the viscosity of solution prepared with the composition of the Comparative Example after storage for 6.5 months. A comparison of the viscosities prepared with the compositions of Examples 3-7 and Comparative Example 2 shows that, the viscosities of solutions prepared with compositions of the Examples after storage for 4.5 months or 6.5 months are much higher than the viscosity of solution prepared with the composition of the Comparative Example after storage for 4.5 months or 6.5 months. As compared to the Comparative Examples, the compositions obtained in the Examples exhibit higher viscosities, indicating that water-soluble salts of chelating agents, especially water-soluble monovalent salts of the chelating agents, can alleviate the decrease in the molecular weight of polyurethane polymers and prolong the shelf life of the compositions.

The viscosity of solution prepared with composition of Comparative Example 2 after storage for 6.5 months is much higher than the viscosity of solution prepared with the composition of Comparative Example 3 after storage for 6.5 months. This fact indicates that chelating agents in an acid form cannot alleviate the decrease in the molecular weight of polyurethane polymers, but, instead, can accelerate such a decrease in molecular weight.

time, as compared to the adhesives formed from the compositions obtained in the Comparative Examples. A comparison of the pull-apart distances observed with the compositions of Examples 3-7 and Comparative Example 7 shows that, after storage for 2.5 months, the adhesive formed from the composition obtained in the Comparative Example, with less than 0.04% by weight of the water-soluble salt of the chelating agent, exhibits a much greater pull-apart distance. A small pull-apart distance and/or a long full-debonding time indicates a good initial heat resistance of the adhesive. It is thus shown that, after storage for a period of time, the compositions obtained in the Examples according to the invention exhibit a superior performance as compared to those obtained in the Comparative Examples, which indicates that the addition of a certain amount of a water-soluble salt of a chelating agent, especially a water-soluble monovalent salt of a chelating agent, is beneficial for prolonging the shelf life of the composition. A comparison between Comparative Example 2 and Comparative Example 3 shows that the addition of a chelating agent in an acid form cannot improve the heat resistance of the adhesives formed from the composition, but, instead, can reduce its heat resistance. Thus, it can be seen that chelating agents in an acid form are unbeneficial for prolonging the shelf life of the composition.

It will be understood by those skilled in the art that the present invention is not limited to the details described above and that the invention can be embodied in other particular forms without departing from the spirit or essential characteristics thereof. It is to be understood that the embodiments are to be considered in all respects as illustrative rather than restrictive, and that the scope of the invention is defined by the appended claims rather than by the foregoing description, and that any modifications, fall

TABLE 3

Pull-apart distance or full-debonding time for coatings formed from the compositions obtained in the Examples according to the invention and the Comparative Examples

| | Pull-apart distance (mm)/Full-debonding time (min) | | | | |
|---|---|---|---|---|---|
| | Composition stored for 4 weeks | Composition stored for 2 months | Composition stored for 2.5 months | Composition stored for 4 months | Composition stored for 6 months |
| Ex. 1 | | | | 6.5 mm | |
| Ex. 2 | | | | 5.5 mm | |
| Ex. 3 | | | 9.0 mm | | |
| Ex. 4 | | | 7.5 mm | | |
| Ex. 5 | | 8 mm | 11.5 mm | | |
| Ex. 6 | | 6 mm | 9.5 mm | | |
| Ex. 7 | | 4.5 mm | 5.5 mm | | |
| Ex. 8 | | | | | 69 mm |
| Ex. 9 | | | | | 7.3 mm |
| Ex. 10-1 | 97.5 mm | | | | |
| Ex. 10-2 | 97.5 mm | | | | |
| Ex. 10-3 | 39.0 mm | | | | |
| Ex. 10-4 | 89.5 mm | | | | |
| Ex. 10-5 | 65.0 mm | | | | |
| Ex. 10-6 | 97.5 mm | | | | |
| Comp. Ex. 1 | | | | 96 mm | |
| Comp. Ex. 2 | | 11 mm | 15.5 mm | 42.5 mm | |
| Comp. Ex. 3 | | 9.6 min | | 2.3 min | |
| Comp. Ex. 4 | | | | | 19.4 min |
| Comp. Ex. 5 | 17.1 min | | | | |
| Comp. Ex. 7 | | | 14.5 mm | | |

A comparison of the pull-apart distances and the full-debonding time observed with the compositions of the Examples and the Comparative Examples shows that, after storage for 4 weeks to 6 months, the adhesives formed from the compositions according to the present invention exhibit a smaller pull-apart distance and a longer full-debonding within the meaning or scope of the equivalents of the invention as defined in the claims, should be regarded as belonging to a part of the invention.

The invention claimed is:

1. A composition, comprising water, a polyurethane polymer and a water-soluble salt of a chelating agent, said polyurethane polymer having a hydrolyzable group, said polyurethane polymer is a reaction product obtained from the following reactive components:

Component A) an isocyanate,

Component B) a compound having an isocyanate-reactive group, wherein said compound comprises at least one group that can be converted to said hydrolyzable group, and wherein said compound has a melting enthalpy of greater than 15 J/g as measured by DSC using the first heating curve in a temperature range of from 20 to 100° C. according to DIN65467, optionally Component C) an emulsifier, optionally Component D) a solvent, and optionally Component E) a reactive diluent;

the composition, after being dried and formed into a film, or said polyurethane polymer has a melting enthalpy of greater than 15 J/g as measured by DSC using the first heating curve in a temperature range of from 20 to 100° C. according to DIN65467;

said water-soluble salt of the chelating agent is present in an amount of from 0.04 to 1.8% by weight, relative to 100% by weight of said polyurethane polymer; and said water-soluble salt of the chelating agent comprises a water-soluble monovalent salt of the chelating agent present in an amount of no less than 30% by weight, relative to 100% by weight of said water-soluble salt of the chelating agent.

2. The composition according to claim 1, wherein said water-soluble salt of the chelating agent is present in an amount of from 0.04 to 0.5% by weight, relative to 100% by weight of said polyurethane polymer.

3. The composition according to claim 1, wherein said water-soluble salt of the chelating agent is present in an amount of from 0.05 to 0.4% by weight, relative to 100% by weight of said polyurethane polymer.

4. The composition according to claim 1, wherein said water-soluble salt of the chelating agent is present in an amount of from 0.1 to 0.2% by weight, relative to 100% by weight of said polyurethane polymer.

5. The composition according to claim 1, wherein, said hydrolyzable group is one or more selected from the group consisting of polyester groups, polycarbonate groups, and polyanhydride groups.

6. The composition according to claim 1, wherein said water-soluble salt of the chelating agent satisfies the following relationship: when the water-soluble salt of the chelating agent is present in an aqueous solution in an amount of $4.3*10^{-7}$ mol/g, the aqueous solution has a pH value of greater than 4.

7. The composition according to claim 1, wherein, said water-soluble monovalent salt of the chelating agent is one or more selected from the group consisting of monovalent ethylenediamine tetraacetate, monovalent tartrate, monovalent citrate, monovalent pyrophosphate, monovalent tripolyphosphate, monovalent hexametaphosphate and monovalent gluconate.

8. The composition according to claim 1, further comprising a stabilizer, wherein said stabilizer is one or more selected from the group consisting of carbodiimide compounds, epoxy compounds, oxazoline compounds, and aziridine compounds, and said stabilizer is present in an amount of from 0.5 to 10% by weight, relative to 100% by weight of said polyurethane polymer.

9. The composition according to claim 1, wherein said composition is a coating material, a sealant or an adhesive.

10. A process for the production of the composition according to claim 1, comprising the steps of: mixing water, said polyurethane polymer or the reactive components for producing said polyurethane polymer, and said water-soluble salt of the chelating agent.

11. The process according to claim 10, wherein, said composition is produced by forming an aqueous polyurethane dispersion with the water and said polyurethane polymer, and then introducing into the dispersion said water-soluble salt of the chelating agent.

12. The process according to claim 10, wherein said composition is produced by mixing said water-soluble salt of the chelating agent with the component B) or the component C) for producing said polyurethane polymer, and then mixing the resultant with other reactive components for producing said polyurethane polymer.

13. The process according to claim 12, wherein the mixing of said water-soluble salt of the chelating agent with the component B) or the component C) for producing said polyurethane polymer is conducted in the presence of water.

14. The process according to claim 10, further comprising adding said water-soluble salt of the chelating agent as an aqueous solution.

15. A method comprising utilizing the composition according to claim 1 for the production of a coated article.

16. A coated article, comprising a substrate and the composition according to claim 1 coated on said substrate.

17. A process for the production of a coated article, comprising coating the composition according to claim 1 onto a substrate.

* * * * *